United States Patent
Sato et al.

(10) Patent No.: US 10,789,366 B2
(45) Date of Patent: Sep. 29, 2020

(54) SECURITY INFORMATION MANAGEMENT SYSTEM AND SECURITY INFORMATION MANAGEMENT METHOD

(71) Applicant: NIPPON TELEGRAPH AND TELEPHONE CORPORATION, Chiyoda-ku (JP)

(72) Inventors: Tohru Sato, Musashino (JP); Yasushi Okano, Musashino (JP); Hiroshi Asakura, Musashino (JP); Shingo Orihara, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 0 days.

(21) Appl. No.: 14/898,388

(22) PCT Filed: Jun. 18, 2014

(86) PCT No.: PCT/JP2014/066193
§ 371 (c)(1),
(2) Date: Dec. 14, 2015

(87) PCT Pub. No.: WO2014/208427
PCT Pub. Date: Dec. 31, 2014

(65) Prior Publication Data
US 2016/0140344 A1    May 19, 2016

(30) Foreign Application Priority Data

Jun. 24, 2013  (JP) .................................. 2013-132057

(51) Int. Cl.
*G06F 21/57*     (2013.01)
*H04L 29/06*    (2006.01)
*G06F 21/55*     (2013.01)

(52) U.S. Cl.
CPC .......... *G06F 21/577* (2013.01); *G06F 21/552* (2013.01); *H04L 63/145* (2013.01);
(Continued)

(58) Field of Classification Search
CPC ..... G06F 21/577; G06F 21/552; H04L 63/145
See application file for complete search history.

(56) References Cited

U.S. PATENT DOCUMENTS 8,442,926 B2   5/2013  Kato et al.
9,323,839 B2   4/2016  Shibata et al.
(Continued)

FOREIGN PATENT DOCUMENTS

CN   101911067 A   12/2010
CN   103299304 A    9/2013
(Continued)

OTHER PUBLICATIONS

Decision to Grant a Patent dated Nov. 8, 2016 in Japanese Patent Application No. 2015-524004 with English translation.
(Continued)

*Primary Examiner* — Vance M Little
(74) *Attorney, Agent, or Firm* — Oblon, McClelland, Maier & Neustadt, L.L.P.

(57) ABSTRACT

In a security information management device (10), security information, which is information related to security, is collected. The security information management device (10) extracts, by referring to a security dictionary storing therein a keyword related to security for each attribute, a keyword from referrer security information that becomes a source to be compared with security information for relevance thereto, and calculates, by comparing the extracted keyword with a keyword included in the collected security information, relevance between the referrer security information and the security information. The security information management
(Continued)

device (10) then output security information having higher calculated relevance more preferentially.

10 Claims, 6 Drawing Sheets

(52) U.S. Cl.
CPC .............. *G06F 2221/034* (2013.01); *G06F 2221/2115* (2013.01); *G06F 2221/2151* (2013.01)

(56) References Cited

U.S. PATENT DOCUMENTS

| | | | | |
|---|---|---|---|---|
| 2002/0038430 A1* | 3/2002 | Edwards | ................ | H04L 29/06 |
| | | | | 726/26 |
| 2005/0050045 A1 | 3/2005 | Taira et al. | | |
| 2005/0108037 A1* | 5/2005 | Bhimani | ............... | G06F 21/577 |
| | | | | 709/217 |
| 2006/0010129 A1 | 1/2006 | Numata | | |
| 2007/0067848 A1* | 3/2007 | Gustave | ............. | H04L 63/1433 |
| | | | | 726/25 |
| 2009/0007272 A1* | 1/2009 | Huang | ................... | G06F 21/57 |
| | | | | 726/26 |
| 2009/0024627 A1 | 1/2009 | King | | |
| 2010/0114882 A1* | 5/2010 | Wiegering | ......... | G06F 16/9535 |
| | | | | 707/728 |
| 2010/0153394 A1* | 6/2010 | Wood | .................. | G06Q 10/107 |
| | | | | 707/737 |
| 2010/0228742 A1* | 9/2010 | Vandelle | ................ | G06Q 30/02 |
| | | | | 707/750 |
| 2010/0299589 A1* | 11/2010 | Yamada | .............. | G06F 16/9535 |
| | | | | 715/235 |
| 2011/0173638 A1* | 7/2011 | Nakamae | ............... | G06Q 10/10 |
| | | | | 719/318 |
| 2011/0178962 A1* | 7/2011 | Sood | ....................... | H04L 51/12 |
| | | | | 706/11 |
| 2012/0136560 A1* | 5/2012 | Muramatsu | .......... | G08G 1/0133 |
| | | | | 701/117 |

FOREIGN PATENT DOCUMENTS

| | | | | |
|---|---|---|---|---|
| EP | 1072982 A2 * | 1/2001 | .......... | G06F 16/334 |
| JP | 2007-58514 A | 3/2007 | | |
| JP | 2009-15570 A | 1/2009 | | |
| JP | 4935399 B2 | 5/2012 | | |
| JP | 2012-243268 A | 12/2012 | | |
| JP | 2013-101623 A | 5/2013 | | |

OTHER PUBLICATIONS

Extended European Search Report dated Nov. 28, 2016 in European Patent Application No. 14816872.7.
International Search Report dated Jul. 29, 2014 in PCT/JP2014/066193 filed Jun. 18, 2014.
Combined Chinese Office Action and Search Report dated Apr. 3, 2018 in Patent Application No. 201480035891.2 (with English language translation), 10 pages.

* cited by examiner

FIG.2

| FIELD NAME | | CONTENT |
|---|---|---|
| URL OF FILE OF SECURITY INFORMATION OBTAINED FROM INFORMATION PROVIDING SERVER | | http://aaa.bb.b |
| TIME AT WHICH FILE OF SECURITY INFORMATION WAS COLLECTED FROM INFORMATION PROVIDING SERVER | | 2013/3/22 00:00:00 |
| "TITLE" | | VULNERABILITY OF BUFFER OVERFLOW IN UPDATING FUNCTION OF PRODUCT A |
| "BODY" | | VULNERABILITY OF BUFFER OVERFLOW HAS BEEN CONFIRMED IN UPDATE PROCESSING FOR PRODUCT A. THERE IS A POSSIBILITY THAT SERVICE DENIAL MAY BE CAUSED OR AN ARBITRARY CODE MAY BE EXECUTED WITH AN OPERATION RIGHT OF PRODUCT A, BY A REMOTE THIRD PARTY |
| KEYWORD | VULNERABILITY | BUFFER OVERFLOW |
| | PRODUCT/SERVICE | PRODUCT A |
| | PRODUCT/SERVICE PROVIDER | COMPANY A |
| | COUNTRY/ ORGANIZATION NAME | COUNTRY B |
| | CYBER ATTACK | SERVICE DENIAL |

FIG.3

| ID | TITLE + BODY | KEYWORD | |
|---|---|---|---|
| SECURITY INFORMATION A | VULNERABILITY OF BUFFER OVERFLOW IN UPDATING FUNCTION OF PRODUCT A<br><br>VULNERABILITY OF BUFFER OVERFLOW HAS BEEN CONFIRMED IN UPDATE PROCESSING FOR PRODUCT A. THERE IS A POSSIBILITY THAT SERVICE DENIAL MAY BE CAUSED OR AN ARBITRARY CODE MAY BE EXECUTED WITH AN OPERATION RIGHT OF PRODUCT A, BY A REMOTE THIRD PARTY. | VULNERABILITY | BUFFER OVERFLOW |
| | | PRODUCT/ SERVICE | PRODUCT A |
| | | PRODUCT/ SERVICE PROVIDER | (N/A) |
| | | COUNTRY/ ORGANIZATION NAME | (N/A) |
| | | CYBER ATTACK | SERVICE DENIAL |
| SECURITY INFORMATION B | VULNERABILITY OF CROSS SITE SCRIPTING IN PRODUCT B<br><br>THERE IS A POSSIBILITY THAT, IF A USER REFERS TO AN HTML MAIL INCLUDING A MALICIOUS SCRIPT, THE SCRIPT MAY BE EXECUTED.<br>THERE IS A POSSIBILITY THAT LEAKAGE OF A LOGIN ID, A PASSWORD, AND SESSION INFORMATION MAY OCCUR AND THAT BROWSING OF A MAIL, FALSIFICATION OF SETUP INFORMATION, OR THE LIKE BY MASQUERADE MAY OCCUR. | VULNERABILITY | CROSS SITE SCRIPTING |
| | | PRODUCT/ SERVICE | PRODUCT B |
| | | PRODUCT/ SERVICE PROVIDER | (N/A) |
| | | COUNTRY/ ORGANIZATION NAME | (N/A) |
| | | CYBER ATTACK | FALSIFICATION |

SECURITY INFORMATION MANAGEMENT SYSTEM AND SECURITY INFORMATION MANAGEMENT METHOD

FIELD

The present invention relates to a security information management system and a security information management method.

BACKGROUND

Conventionally, in order to continue stable organization activities in an organization having information system assets, an administrator of the information system assets (hereinafter, referred to as "system administrator") collects and comprehend security information highly relevant to the information system assets, which are of their belonging organization and are a target to be managed, and quickly deals with any serious threat that is found.

Such security information is newly made open to the public successively through information providing servers and the like on the Internet by security research institutes, security vendors, and the like. As the security information made open to the public on the Internet, for example, information related to a security defect of software or hardware forming an information system and to a countermeasure against the security defect, and the like have been known.

For example, as a technique for collecting and providing security information, with respect to vulnerability information of security information, for example, a technique for collecting vulnerability information made open to the public by an information providing server on the Internet has been known (see Patent Literature 1). In this technique, by executing collection based on relations such as reference relations of plural sets of vulnerability information that have been collected and determination of relevance between the collected vulnerability information and an information system asset managed by a system administrator, vulnerability information to be preferentially browsed by the system administrator is collected and provided.

CITATION LIST

Patent Literature

Patent Literature 1: Japanese Patent No. 4935399

SUMMARY

Technical Problem

However, in the above described technique for collecting and providing security information, relevance of security information other than the vulnerability information is unable to be determined and provided to the system administrator. Therefore, there has been a problem that the system administrator may not be able to easily collect security information highly relevant to referrer security information used as a referrer.

For example, if collection is performed, with certain security information being referrer security information, by using a search engine or the like provided on the Internet through use of a keyword included in the referrer security information as a clue, unless a system administrator has knowledge related to security, an appropriate keyword is unable to be selected and highly relevant security information is unable to be collected.

Further, when the collection is performed by using the search engine or the like provided on the Internet through the use of the keyword included in the referrer security information as the clue, even if the system administrator has the knowledge related to security, depending on the keyword input in the search engine, a search result with much security information having low relevance and much general information other than security information mixed therein may be provided, and much labor may be required in distinguishing highly relevant security information therefrom.

Therefore, an object of this invention is to easily collect security information highly relevant to referrer security information.

Solution to Problem

A security information management system includes: a collecting unit that collects security information that is information related to security; a calculating unit that extracts, by referring to a security dictionary storing therein a keyword related to the security for each attribute, a keyword from referrer security information that becomes a source to be compared with the security information for relevance thereto, and calculates, by comparing the extracted keyword with a keyword included in the security information collected by the collecting unit, relevance between the referrer security information and the security information; and an output unit that outputs security information having higher relevance calculated by the calculating unit more preferentially.

A security information management method executed by a security information management device, the security information management method includes: a collecting step of collecting security information that is information related to security; a calculating step of extracting, by referring to a security dictionary storing therein a keyword related to the security for each attribute, a keyword from referrer security information that becomes a source to be compared with the security information for relevance thereto, and calculating, by comparing the extracted keyword with a keyword included in the security information collected by the collecting step, relevance between the referrer security information and the security information; and an output step of outputting security information having higher relevance calculated by the calculating step more preferentially.

Advantageous Effects of Invention

A security information management system and a security information management method disclosed in this application enable easy collection of security information highly relevant to referrer security information.

DESCRIPTION OF EMBODIMENT

Hereinafter, with reference to the appended drawings, an embodiment of a security information management system and a security information management method according to the invention will be described in detail. The invention is not limited by this embodiment.

First Embodiment

In the following embodiment, flows of processes by a security information management system and a security information management method according to a first embodiment will be described in sequence, and lastly, effects by the first embodiment will be described.

[Configuration of System]

Figure 1:
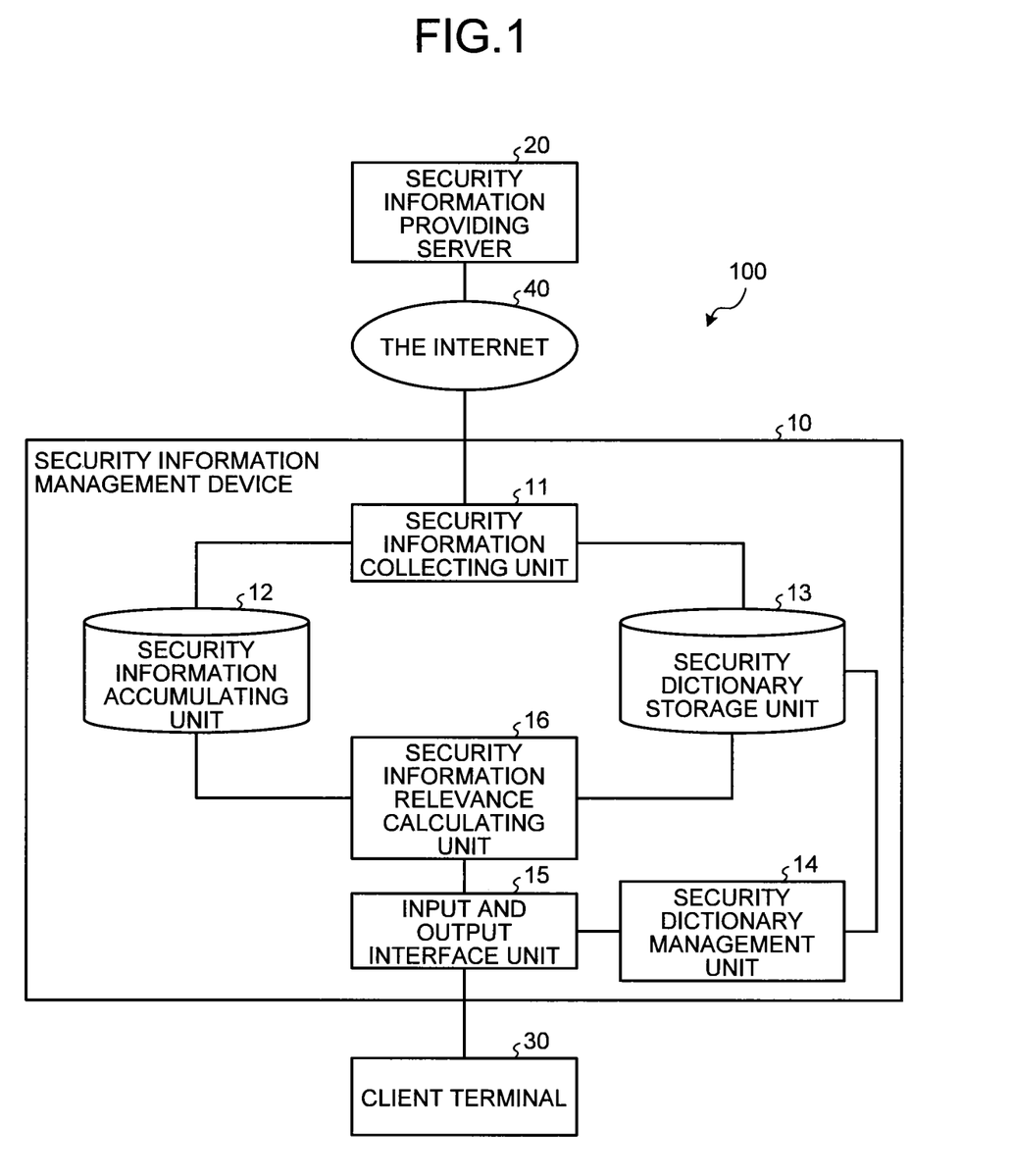
FIG. 1 is a diagram illustrating an example of a configuration of a security information management system according to a first embodiment.

First of all, an example of a configuration of a security information management system 100, to which a security information management device according to the first embodiment is applied, will be described. FIG. 1 is a diagram illustrating the example of the configuration of the security information management system according to the first embodiment. As illustrated in FIG. 1, the security information management system 100, to which a security information management device 10 according to the first embodiment is applied, has the security information management device 10, a security information providing server 20, and a client terminal 30. Further, in the security information management system 100, the security information management device 10 and the security information providing server 20 are connected to each other via the Internet 40. Furthermore, the security information management device 10 is connected to the client terminal 30 via an input and output interface unit 15.

The security information providing server 20 is a server that makes security information open to the public. For example, the security information providing server 20 makes security information open to the public, the security information being text information (hereinafter, referred to as "vulnerability information") related to a security defect (which may be expressed as, for example, "vulnerability", "a security hole", or the like) of software or hardware forming an information system and to a countermeasure against the security defect.

Further, for example, the security information providing server 20 makes security information open to the public, the security information being text information related to a technique (which may be expressed as "Proof of Concept (PoC)", "exploit", or the like) for abusing the above mentioned security defect and to a countermeasure against the technique.

Furthermore, for example, the security information providing server 20 makes security information open to the public, the security information being text information related to a malicious program (which may be expressed as "(computer) virus", "malware", or the like), which has been generated by use of the above mentioned abusing technique and aims to damage an information system of a third party and to a countermeasure against the malicious program.

Moreover, the security information providing server 20 makes security information open to the public, the security information being text information related to news or a case of an attack (which may be expressed as "targeted attack", "advanced persistent threat (APT) attack", "cyber attack", or the like) on an information system of another organization, the attack having been executed by use of the above mentioned malicious program.

The client terminal 30 is an information processing device, such as a PC, which is used by a system administrator in utilizing the security information management system 100 and installed with a standard Web browser. Further, the client terminal 30 receives, from the security information management device 10, security information highly relevant to referrer security information, and displays the security information.

[Configuration of Security Information Management Device]

Next, a configuration of the security information management device 10 illustrated in FIG. 1 will be described. As illustrated in FIG. 1, the security information management device 10 has a security information collecting unit 11, a security information accumulating unit 12, a security dictionary storage unit 13, a security dictionary management unit 14, the input and output interface unit 15, and a security information relevance calculating unit 16.

The security information collecting unit 11 collects security information, which is information related to security. Specifically, the security information collecting unit 11 regularly accesses the security information providing server 20 at predetermined time intervals to obtain the security information. The security information is obtained as general document files of HTML, PDF, and the like. The security information collecting unit 11 then processes the obtained files into a predetermined format, adds additional information thereto, and stores them into the security information accumulating unit 12. When the security information collecting unit 11 processes the obtained files into the predetermined format, the security information collecting unit 11 refers to the security dictionary storage unit 13.

For example, the security information collecting unit 11 extracts a title and a body of a document file, and extracts, by referring to a security dictionary stored in the security dictionary storage unit 13, keywords included in the title and body. The security information collecting unit 11 is set with setup information, which is "URL list" of the security information providing server 20 to be a target of collection, "cut-out position information" for extracting "title" and "body" required by the system administrator from security information provided in a format different according to the security information providing server 20, and "information indicating time and interval" indicating timing to execute collection with respect to the security information providing server 20. The security information collecting unit 11 operates based on these sets of setup information. The "cut-out position information" is information defined for each URL in the URL list.

For example, the security information collecting unit 11 obtains a document file, such as an HTML file or a PDF file, in which security information is described, from the security information providing server 20 specified in a URL list, at a time specified in the setup information. The security information collecting unit 11 then extracts, based on the "cut-out position information", "title" and "body" of the security information from the obtained file.

Figure 2:
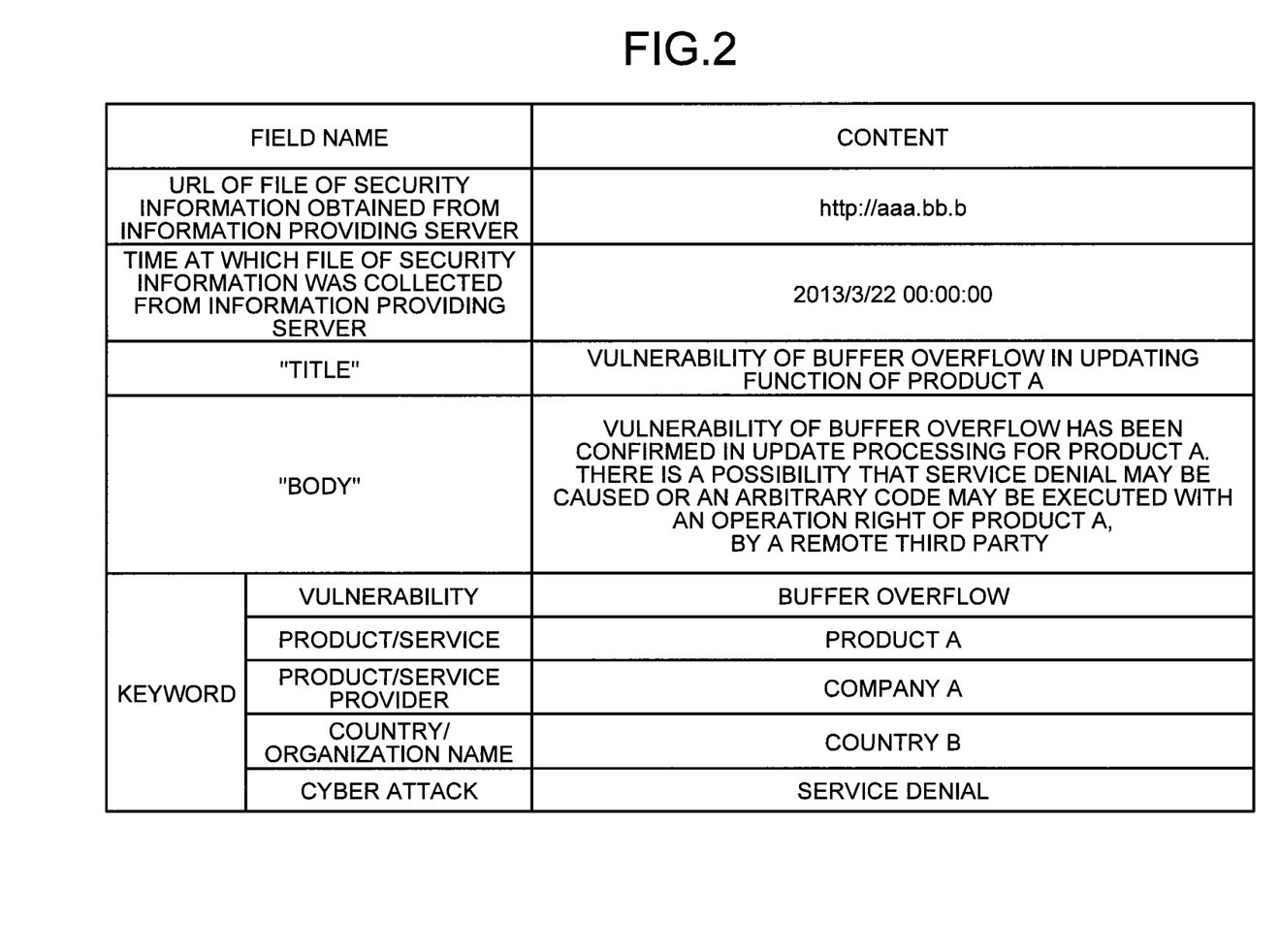
FIG. 2 is a diagram illustrating an example of information extracted by a security dictionary of a security dictionary storage unit according to the first embodiment.

Subsequently, the security information collecting unit 11 extracts keywords included in the extracted "title" and "body" by comparison with the security dictionary, and stores the URL of the information providing server, the time at which the file was collected, the extracted "title" and "body", and all of the extracted keywords, into the security information accumulating unit 12 (which will be described in detail later by use of FIG. 2). Thereafter, the security information collecting unit 11 repeats the above described process until the process for all of URLs in the URL list is finished.

The security information accumulating unit 12 stores therein the security information and the additional information received from the security information collecting unit 11. Further, the security information accumulating unit 12 transmits security information requested by the security information relevance calculating unit 16 to the security information relevance calculating unit 16. Further, in the security information accumulating unit 12, as an attribute of the security information, a keyword related to security is registered respectively for a classification of vulnerability, a classification of a product or service, a classification of a product provider or service provider, a classification of a country or organization, or a classification of a cyber attack.

Figure 3:
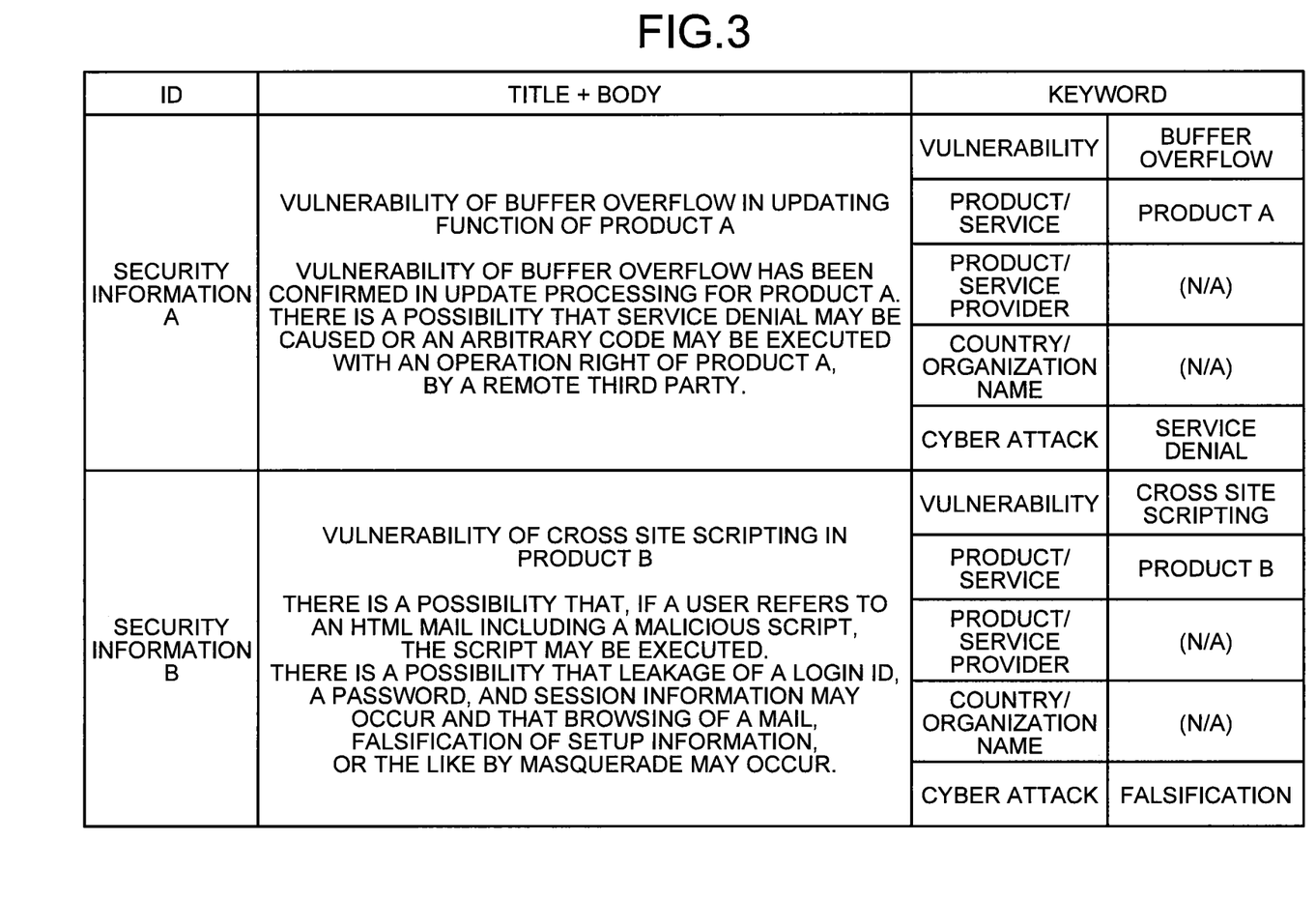
FIG. 3 is a diagram illustrating an example of information stored by a security information accumulating unit according to the first embodiment.

By use of an example in FIG. 3, an example of information stored by the security information accumulating unit 12 will be described. FIG. 3 is a diagram illustrating the example of information stored by the security information accumulating unit according to the first embodiment. As illustrated in FIG. 3, the security information accumulating unit 12 stores therein for each set of security information, the keywords extracted by the security information collecting unit 11, respectively for categories, "vulnerability", "product/service", "product/service provider", "country/organization name", and "cyber attack".

The security dictionary storage unit 13 stores therein a collection of keywords related to a security field to be referred to when relevance of security information is determined. The security dictionary storage unit 13 stores therein the security dictionary storing therein keywords related to security for each attribute, and for example, stores therein a vulnerability dictionary, a product/service dictionary, a product/service provider dictionary, a country/organization name dictionary, and a cyber attack dictionary, as collections of keywords representing characteristics of security information.

The security dictionary storage unit 13 stores therein: as the vulnerability dictionary (including corresponding synonyms), for example, buffer overflow, cross site scripting, and the like; as the product/service dictionary (including corresponding synonyms), for example, Windows (registered trademark) 7, Windows Server 2012, Twitter (registered trademark), and the like; as the product/service provider dictionary (including corresponding synonyms), for example, Microsoft (registered trademark), Google (registered trademark), and the like; as the country/organization name dictionary (including corresponding synonyms), for example, China, Korea, the House of Representatives, company names, and the like; and as the cyber attack dictionary (including corresponding synonyms), for example, cyber attack, targeted attack, targeted mail, information leakage, falsification, and the like.

Further, an example of generation of each dictionary collection will be described. In the vulnerability dictionary, keywords published on domestic and foreign sites explaining with respect to vulnerability are collected by a dedicated crawler or the like and registered. Further, in the product/service provider dictionary, names of product/service providers registered on domestic and foreign sites providing vulnerability information are collected by a dedicated crawler or the like and registered, as the keywords. Furthermore, in the product/service dictionary, names and versions of products/services registered on product introduction sites managed by product/service providers are collected by a dedicated crawler or the like and registered, as the keywords. Moreover, in the country/organization name dictionary, lists of domestic and foreign government offices, listed companies, and the like, are collected by a dedicated crawler or the like and registered. Further, in the cyber attack dictionary, keywords published on domestic and foreign sites explaining various tricks and methods of cyber attacks are collected by a dedicated crawler or the like and registered. In addition, the system administrator may manually perform registration with the security dictionary management unit 14.

By use of FIG. 2, an example of information extracted by the security dictionary of the security dictionary storage unit 13 will be described. FIG. 2 is a diagram illustrating an example of the information extracted by the security dictionary of the security dictionary storage unit according to the first embodiment. As exemplified in FIG. 2, the security information accumulating unit 12 stores therein, as security information, "URL of file of security information obtained from information providing server (security information providing server 20)", "time at which file of security information was collected from information providing server", "title", "body", and "keyword". The "title", "body", and "keyword" are information extracted from a file of security information, by the security dictionary stored in the security dictionary storage unit 13 being referred to. Further, all of the extracted keywords are stored based on the classification of each security dictionary. If no keyword is extracted, storage is executed with "content" corresponding to keyword being empty.

The security dictionary management unit 14 executes addition or deletion of a keyword related to the security field included in the dictionary. For example, the security dictionary management unit 14 receives an operation instruction of the system administrator and adds or deletes a keyword related to the security field.

The input and output interface unit 15 receives a request from the client terminal 30, and transmits a result of determination of relevance to the client terminal 30, as a response to the request. Specifically, the input and output interface unit 15 receives, from the client terminal 30 of the system administrator, referrer security information, a threshold of vulnerability score, a threshold of product/service score, a threshold of product/service provider score, a threshold of country/organization name score, and a threshold of cyber attack score, and transmits them to the security information relevance calculating unit 16.

The vulnerability score is a numerical value representing relevance when the referrer security information and each set of security information accumulated in the security information accumulating unit 12 are compared with each other by use of "vulnerability dictionary". The product/service score is a numerical value representing relevance when the referrer security information and each set of security information accumulated in the security information accumulating unit 12 are compared with each other by use of "product/service dictionary". The product/service provider score is a numerical value representing relevance when the referrer security information and each set of security information accumulated in the security information accumulating unit 12 are compared with each other by use of "product/service provider dictionary". The country/ organization name score is a numerical value representing relevance when the referrer security information and each set of security information accumulated in the security information accumulating unit 12 are compared with each other by use of "country/organization name dictionary". The cyber attack score is a numerical value representing relevance when the referrer security information and each set of security information accumulated in the security information accumulating unit 12 are compared with each other by use of "cyber attack dictionary".

Further, the threshold of vulnerability score, the threshold of product/service score, the threshold of product/service provider score, the threshold of country/organization name score, and the threshold of cyber attack score are index values for determining relevance between the referrer security information and each set of security information accumulated in the security information accumulating unit 12 based on the above described five types of scores. Of the security information that has been accumulated in the security information accumulating unit 12, security information having a score exceeding the threshold is determined as "having relevance to referrer security information". Further, the thresholds are individually set by the system administrator respectively for the above described five types of scores. For example, the system administrator transmits each of the thresholds to the security information relevance calculating unit 16 through the input and output interface unit 15 from the client terminal 30.

For input of the referrer security information, a function for displaying a text box, in which arbitrary text is able to be input, and making the system administrator execute the input may be installed. For the input of the referrer security information, a button for executing operation of transmitting the security information being displayed to the security information relevance calculating unit 16 by one click may be displayed on a browser screen of the client terminal 30. For the input of each threshold, a function of causing the system administrator to make a selection by displaying values obtainable by a score calculation formula as selections may be installed.

Further, for the input of each threshold, a function for reducing the burden of operation of inputting the threshold every time for the system administrator, by setting a standard value in advance, and using that standard value if there is no input of the threshold by the system administrator may be installed.

Further, the input and output interface unit 15 receives total values of the scores from the security information relevance calculating unit 16, and displays security information with all of the five types of scores representing the relevance to the referrer security information exceeding the transmitted thresholds, on the client terminal 30 in descending order of the total values. A function may be installed, which is for further narrowing down the security information to be displayed upon the display, by a filter using "URL of file of security information obtained from information providing server", "time at which file of security information was collected from information providing server", and "keywords included in "title" and "body" of security information", which the security information has. A function may be installed, which is for exporting to outside, after the security information highly relevant to the referrer security information has been displayed, a result of the display in a format of a document file, such as a text file or a PDF file.

The security information relevance calculating unit 16 extracts a keyword from the referrer security information that becomes a source to be compared with security information for relevance thereto, by referring to the security dictionary storage unit 13 storing therein keywords related to security for each attribute, and calculates relevance between the referrer security information and the security information by comparing the extracted keyword with the keywords included in the security information collected by the security information collecting unit 11.

Based on a request from the input and output interface unit 15, the security information relevance calculating unit 16 obtains security information stored in the security information accumulating unit 12 and executes relevance determination. The security information relevance calculating unit 16 then transmits a result of the relevance determination to the client terminal 30 via the input and output interface unit 15. The higher the relevance of the security information calculated by the security information relevance calculating unit 16 is, the more preferentially it is output by the input and output interface unit 15 to the client terminal 30.

For example, the security information relevance calculating unit 16 receives, as setup information, from the client terminal 30 via the input and output interface unit 15, the referrer security information that becomes a source to be compared with the security information of the security information accumulating unit 12 for the relevance thereto, the threshold of vulnerability score, the threshold of product/ service score, the threshold of product/service provider score, the threshold of country/organization name score, and the threshold of cyber attack score.

Hereinafter, a flow of a specific process by the security information relevance calculating unit 16 will be described. The security information relevance calculating unit 16 extracts a keyword from the referrer security information, by referring to the security dictionary, respectively for the classification of vulnerability, the classification of product or service, the classification of product provider or service provider, the classification of country or organization, or the classification of cyber attack.

The security information relevance calculating unit 16 then compares the keyword extracted from the referrer security information with the vulnerability keyword of each set of security information accumulated in the security information accumulating unit 12 to calculate a vulnerability score. Specifically, the security information relevance calculating unit 16 extracts a keyword from the referrer security information, by referring to the security dictionary, respectively for the classification of vulnerability, the classification of product or service, the classification of product provider or service provider, the classification of country or organization, or the classification of cyber attack, and calculates relevance between the referrer security information and the security information by comparing the keywords extracted from the referrer security information respectively with the keywords included in the security information collected by the collecting unit.

Figure 4:
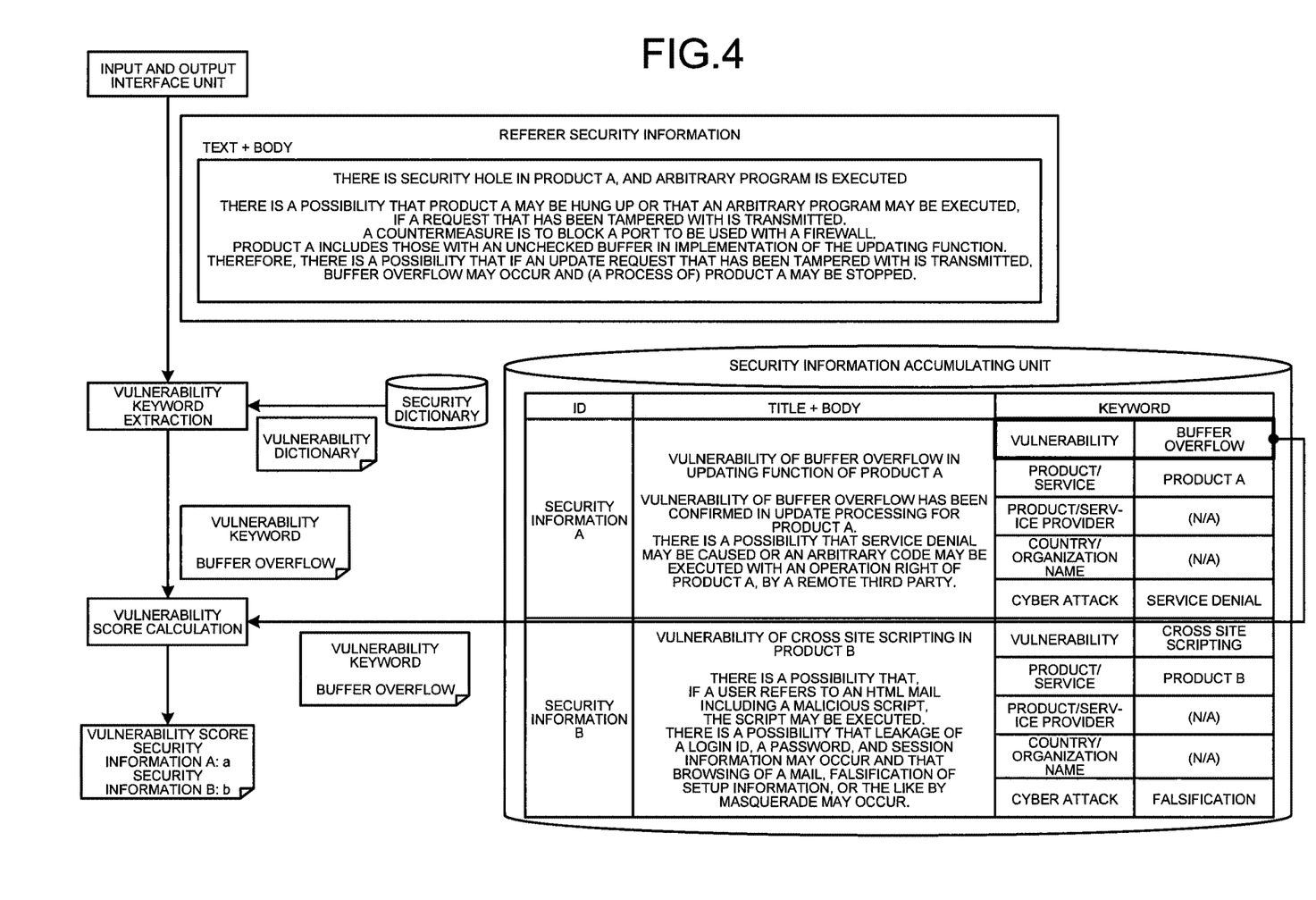
FIG. 4 is a diagram illustrating an example of a vulnerability score calculation process by a security information relevance calculating unit.

By use of FIG. 4, an example of a vulnerability score calculation process by the security information relevance calculating unit 16 will be described. FIG. 4 is a diagram illustrating the example of the vulnerability score calculation process by the security information relevance calculating unit. As illustrated in FIG. 4, first, the security information relevance calculating unit 16 receives, via the input and output interface unit 15, referrer security information including text and a body, from the client terminal 30.

The security information relevance calculating unit 16 then extracts, for example, "buffer overflow", as a keyword included in the vulnerability dictionary, from the referrer security information. The security information relevance calculating unit 16 then compares the keyword, "buffer overflow", extracted from the referrer security information, with the vulnerability keywords of security information A and B accumulated in the security information accumulating unit 12, and calculates vulnerability scores.

In the example in FIG. 4, since the vulnerability keyword of the security information A is "buffer overflow" and matches the keyword extracted from the referrer security information, a vulnerability score, "a", of the security information A is calculated. Further, since the vulnerability keyword of the security information B is "cross site scripting" and does not match the keyword extracted from the referrer security information, a vulnerability score, "b", of the security information B is calculated. The vulnerability score, "a", of the security information A is a score higher than that of the vulnerability score, "b", of the security information B. For example, based on the number of matching keywords, a score may be calculated. For example, the vulnerability score of the security information A maybe "1" and the vulnerability score of the security information B may be "0".

Further, a score may be calculated by use of a commercial/free machine learning library, and by finding a feature vector of each, similarity between feature vectors may be found as a numerical value. By use of this method, determination of similarity between sets of security information having similar keywords, such that the keywords do not completely match each other, becomes possible.

Subsequently, the security information relevance calculating unit 16 similarly calculates a product/service score with respect to "product/service dictionary". The security information relevance calculating unit 16 then similarly calculates a product/service provider score with respect to "product/service provider dictionary".

Thereafter, the security information relevance calculating unit 16 similarly calculates a country/organization name score with respect to "country/organization name dictionary". The security information relevance calculating unit 16 then similarly calculates a cyber attack score with respect to "cyber attack dictionary". Weighting may be set for each score.

The security information relevance calculating unit 16 then sums up the scores. The security information relevance calculating unit 16 then sorts the security information of the security information accumulating unit 12 in descending order of total values of the scores. However, upon the sorting, any security information having a score less than at least one of the above described five types of thresholds is removed from a target to be sorted.

The security information relevance calculating unit 16 then transmits the security information in the sorted order to the input and output interface unit 15. In order to improve the processing speed, a systematic upper limit maybe set for the number of sets of security information to be transmitted then.

[Process by Security Information Management Device]

Figure 5:
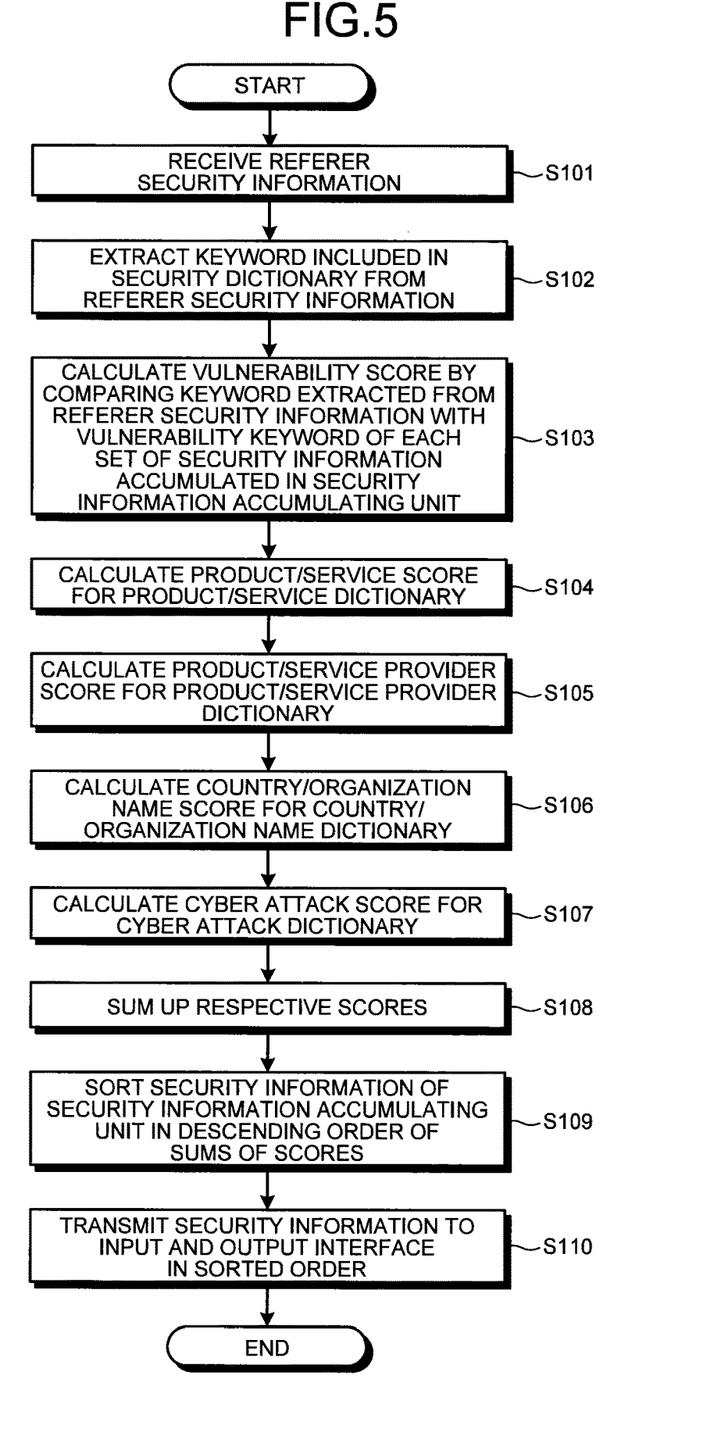
FIG. 5 is a flow chart illustrating a flow of a security information providing process in the security information management device according to the first embodiment.

Next, by use of FIG. 5, a process by the security information management device 10 according to the first embodiment will be described. FIG. 5 is a flow chart illustrating a flow of a security information providing process in the security information management device according to the first embodiment.

First, by use of FIG. 5, the flow of the security information providing process in the security information management device according to the first embodiment will be described. As illustrated in FIG. 5, when referrer security information is received from the client terminal 30 via the input and output interface unit 15 (Step S101), the security information relevance calculating unit 16 of the security information management device 10 extracts a keyword included in the security dictionary from the referrer security information (Step S102).

The security information relevance calculating unit 16 then compares the keyword extracted from the referrer security information with a vulnerability keyword of each set of security information accumulated in the security information accumulating unit 12 and calculates a vulnerability score (Step S103).

The security information relevance calculating unit 16 calculates a product/service score with respect to "product/service dictionary", similarly to Step S103 (Step S104). The security information relevance calculating unit 16 then calculates a product/service provider score with respect to "product/service provider dictionary", similarly to Step S103 (Step S105).

Thereafter, the security information relevance calculating unit 16 calculates a country/organization name score with respect to "country/organization dictionary", similarly to Step S103 (Step S106). The security information relevance calculating unit 16 then calculates a cyber attack score with respect to "cyber attack dictionary", similarly to Step S103 (Step S107).

The security information relevance calculating unit 16 then sums up the respective scores (Step S108). The security information relevance calculating unit 16 then sorts the security information of the security information accumulating unit 12 in descending order of total values of the scores (Step S109). However, upon the sorting, any security information having a score less than at least one of the above described five types of thresholds is removed from a target to be sorted.

The security information relevance calculating unit 16 then transmits the security information to the input and output interface unit 15 in the sorted order (Step S110).

Effects by First Embodiment

As described above, in the security information management device 10 according to the first embodiment, security information, which is information related to security, is collected. The security information management device 10 then extracts a keyword from referrer security information that becomes a source to be compared with security information for relevance thereto, by referring to a security dictionary storing therein a keyword related to security for each attribute, and calculates relevance between the referrer security information and the security information, by comparing the extracted keyword with keywords included in the collected security information. The higher the calculated relevance of the security information is, the more preferentially it is output by the security information management device 10. Thereby, security information highly relevant to the referrer security information is able to be output easily.

Further, in the security information management device 10, file information including security information is collected at predetermined time intervals from the security information providing server 20, a title and a body of the file information are extracted, and a keyword included in the title and body is extracted. The security information management device 10 calculates relevance by comparing the keyword included in the extracted title and body with the keyword extracted from the referrer security information. Therefore, relevance is able to be appropriately calculated by comparison between the keyword included in the title and body of the security information and the keyword extracted from the referrer security information.

Further, in the security information management device 10, whether or not the keyword extracted from the referrer security information matches a keyword included in the collected security information is determined, and if they match, relevance between them is calculated to be higher than in a case where they do not match. Therefore, the relevance is able to be calculated easily.

Further, in the security information management device 10, security information, for which the relevance has been calculated, is sorted in descending order of relevance and the security information is output in the sorted order. Therefore, security information highly relevant to the referrer security information is able to be output comprehensibly.

Further, in the security information management device 10, as an attribute of security information, a keyword related to security is registered in a security dictionary respectively for a classification of vulnerability, a classification of product or service, a classification of product provider or service provider, a classification of country or organization, or a classification of cyber attack. The security information management device 10 extracts a keyword from the referrer security information, by referring to the security dictionary, respectively for the classification of vulnerability, the classification of product or service, the classification of product provider or service provider, the classification of country or organization, or the classification of cyber attack. Therefore, the keywords are able to be extracted appropriately.

Further, in the security information management device 10, with reference to the security dictionary, a keyword is extracted from the referrer security information respectively for the classification of vulnerability, the classification of product or service, the classification of product provider or service provider, the classification of country or organization, or the classification of cyber attack, and relevance between the referrer security information and the security information is calculated by comparison between the keywords extracted from the referrer security information and the keywords included in the security information. Therefore, the relevance is able to be calculated easily.

[System Configuration and the Like]

Further, each component of the respective devices is functionally and conceptually illustrated, and is not necessarily physically configured as illustrated in the drawings. That is, specific modes of distribution and integration of the respective devices are not limited to those illustrated in the drawings, and depending on various loads and use situations, all or some of the devices may be configured to be functionally or physically distributed or integrated in arbitrary units. For example, the security information collecting unit 11 and the security information relevance calculating unit 16 may be integrated with each other. Further, all or any part of the processing functions executed by the respective devices may be realized by a CPU and a program analyzed and executed by the CPU, or may be implemented as hardware by wired logic.

Further, of the respective processes described in the embodiment, all or a part of the processes described as being executed automatically may be executed manually, or all or a part of the processes described as being executed manually may be executed automatically by a known method.

In addition, the procedural sequences, control sequences, specific names, and information including various data and parameters described above and illustrated in the drawings may be arbitrarily modified unless otherwise particularly stated.

[Program]

Further, a program, which describes, in a language executable by a computer, the process executed by the security information management device 10 described in the above embodiment, may be generated. Further, a security information management program, which describes the process executed by the security information management device 10 according to the first embodiment in a language executable by a computer, may be generated. In this case, by the computer executing the security information management program, effects that are the same as those of the above embodiment are able to be obtained. Further, by recording that security information management program in a computer readable recording medium and causing the computer to load and execute the security information management program recorded in this recording medium, a process that is the same as that of the first embodiment may be realized. Hereinafter, an example of a computer that executes the security information management program realizing functions that are the same as those of the security information management device 10 illustrated in FIG. 1 will be described.

Figure 6:
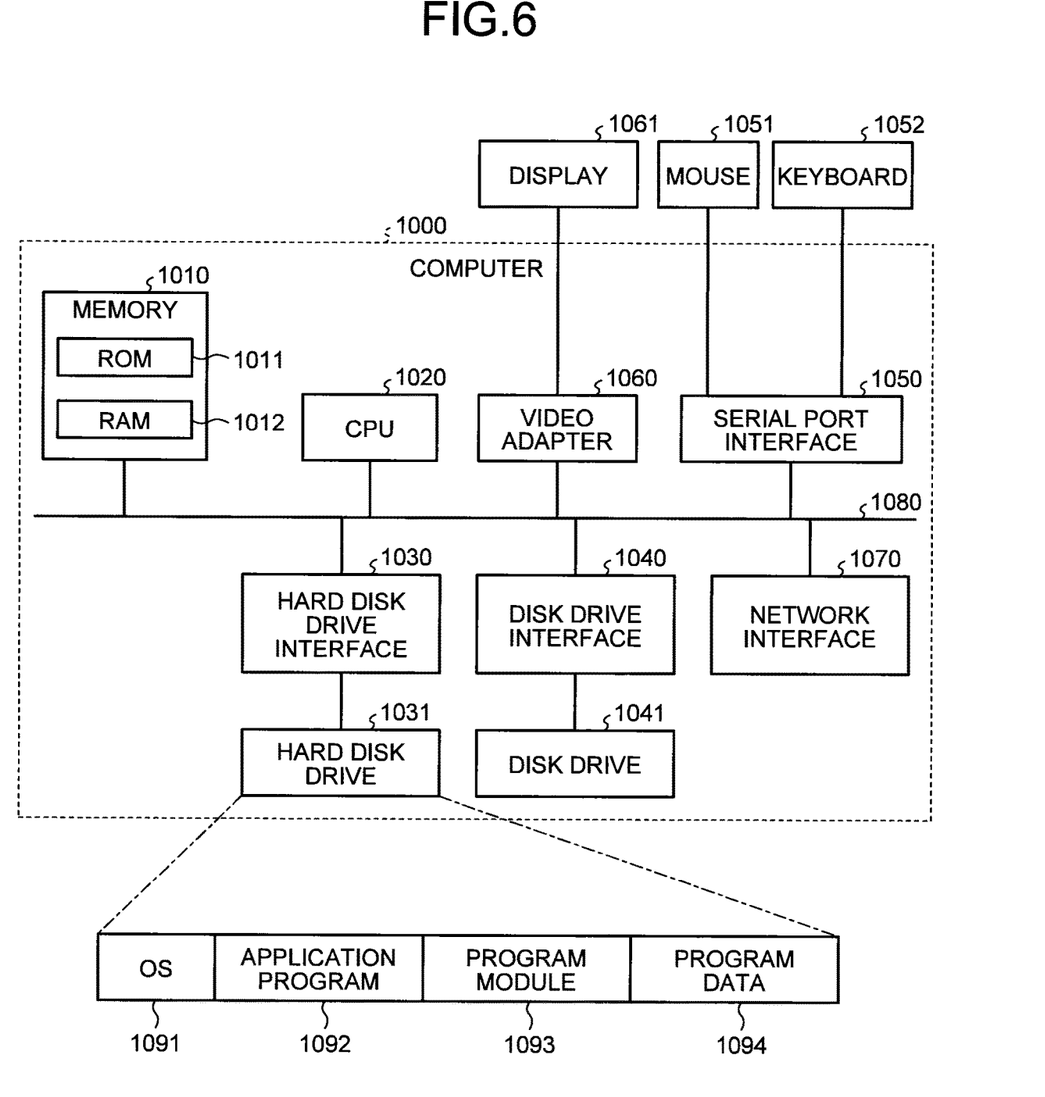
FIG. 6 is a diagram illustrating a computer that executes a security information management program.

FIG. 6 is a diagram illustrating a computer 1000 that executes the security information management program. As exemplified in FIG. 6, the computer 1000 has, for example, a memory 1010, a CPU 1020, a hard disk drive interface 1030, a disk drive interface 1040, a serial port interface 1050, a video adapter 1060, and a network interface 1070, and these respective units are connected to one another by a bus 1080.

The memory 1010 includes, as exemplified in FIG. 6, a read only memory (ROM) 1011, and a RAM 1012. The ROM 1011 stores therein a boot program, such as a basic input output system (BIOS), for example. The hard disk drive interface 1030 is, as exemplified in FIG. 6, connected to a hard disk drive 1031. The disk drive interface 1040 is, as exemplified in FIG. 6, connected to a disk drive 1041. An attachable and detachable storage medium, such as a magnetic disk or an optical disk, for example, is inserted into the disk drive 1041. The serial port interface 1050 is, as exemplified in FIG. 6, connected to, for example, a mouse 1051 and a keyboard 1052. The video adapter 1060 is, as exemplified in FIG. 6, connected to, for example, a display 1061.

As exemplified in FIG. 6, the hard disk drive 1031 stores therein, for example, an OS 1091, an application program 1092, a program module 1093, and program data 1094. That is, the above described security information management program is stored, as a program module, in which commands executed by the computer 1000 are described, in the hard disk drive 1031, for example.

Further, the various data described in the above embodiment are stored, as program data, in, for example, the memory 1010, or the hard disk drive 1031. The CPU 1020 reads, as necessary, the program module 1093 and program data 1094 stored in the memory 1010 or hard disk drive 1031 out to the RAM 1012, and executes various procedures.

The program module 1093 and the program data 1094 related to the security information management program are not necessarily stored in the hard disk drive 1031, and may be stored in, for example, an attachable and detachable recording medium and read out by the CPU 1020 via the disk drive or the like. Or, the program module 1093 or program data 1094 related to the security information management program may be stored in another computer connected via a network (local area network (LAN), wide area network (WAN), or the like) and read out by the CPU 1020 via the network interface 1070.

REFERENCE SIGNS LIST

10 SECURITY INFORMATION MANAGEMENT DEVICE
11 SECURITY INFORMATION COLLECTING UNIT
12 SECURITY INFORMATION ACCUMULATING UNIT
13 SECURITY DICTIONARY STORAGE UNIT
14 SECURITY DICTIONARY MANAGEMENT UNIT
15 INPUT AND OUTPUT INTERFACE UNIT
16 SECURITY INFORMATION RELEVANCE CALCULATING UNIT
20 SECURITY INFORMATION PROVIDING SERVER
30 CLIENT TERMINAL
40 THE INTERNET
100 SECURITY INFORMATION MANAGEMENT SYSTEM

The invention claimed is:

1. A security information management system, comprising:
   circuitry configured to
   store, in security information storage, collected security information that is information related to security, the security information including one or more files, each file having a title, body text, and at least one keyword extracted from the title or the body text;
   receive referrer security information input by a user through a user interface, the referrer security information input into a text box in the user interface as arbitrarily chosen text by the user;
   extract, by referring to a security dictionary storing therein a keyword for each of plural classifications, a keyword from the input referrer security information, calculate, by comparing the extracted keyword from the input referrer security information with the at least one keyword extracted from the title or the body text of each file of the collected security information, respectively, a separate score, and calculate a total score, from the calculated separate scores for each file of the collected security information, indicating an amount of relevance between the input referrer security information and each file of the collected security information,
   wherein
   the plural classifications include at least two of a classification of vulnerability, a classification of product or service, a classification of product provider or service provider, a classification of country or organization, and a classification of cyber attack, and
   the circuitry
   extracts, by referring to the security dictionary, a keyword from the input referrer security information respectively for the at least two of the classification of vulnerability, the classification of product or service, the classification of product provider or service provider, the classification of country or organization, and the classification of cyber attack,
   calculates, as the separate score, a relevance value for each classification by comparing the keyword extracted from the input referrer security information for each classification respectively with keywords included in the collected security information for the respective classification, and calculates the total score for each file of the collected security information by summing up the relevance values calculated for each classification, and
   the circuitry outputs the collected security information in descending order of the calculated total score for each file of the collected security information.

2. The security information management system according to claim 1, wherein
   the circuitry collects the security information at predetermined time intervals from an external device, extracts the title or the body text of each file of the collected security information, and extracts at least one keyword included in the title or body text of each file of the collected security information; and
   the circuitry calculates the amount of relevance by comparing the at least one extracted keyword included in the title or body text of each file of the collected security information, with the keyword extracted from the input referrer security information.

3. The security information management system according to claim 1, wherein the circuitry determines whether or not the keyword extracted from the input referrer security information matches the at least one keyword included in the collected security information, and calculates the amount of relevance to be higher if the keywords match each other, than in a case where the keywords do not match each other.

4. The security information management system according to claim 2, wherein the circuitry determines whether the keyword extracted from the input referrer security information matches the at least one keyword included in the collected security information, and calculates the amount of relevance to be higher if the keywords match each other, than in a case where the keywords do not match each other.

5. The security information management system according to claim 1, wherein
   the circuitry sorts the collected security information, for which the amount of relevance has been calculated, in descending order of relevance, and
   the circuitry outputs the collected security information in the sorted order.

6. The security information management system according to claim 2, wherein
   the circuitry sorts the collected security information, for which the amount of relevance has been calculated, in descending order of relevance, and
   the circuitry outputs the collected security information in the sorted order.

7. The security information management system according to claim 3, wherein
   the circuitry sorts the collected security information, for which the amount of relevance has been calculated, in descending order of relevance, and
   the circuitry outputs the collected security information in the sorted order.

8. The security information management system according to claim 4, wherein
   the circuitry sorts the collected security information, for which the amount of relevance has been calculated, in descending order of relevance, and
   the circuitry outputs the collected security information in the sorted order.

9. A security information management method executed by a security information management device, the security information management method including:

storing, in security information storage, collected security information that is information related to security, the security information including one or more files, each file having a title, body text, and at least one keyword extracted from the title or the body text;

receiving input referrer security information input by a user through a user interface, the referrer security information input into a text box in the user interface as arbitrarily chosen text by the user; and extracting, by referring to a security dictionary storing therein a keyword for each of plural classifications, a keyword from the input referrer security information, calculating, by comparing the extracted keyword from the input referrer security information with the at least one keyword extracted from the title or the body text of each file of the collected security information, respectively, a separate score, and calculating a total score, from the calculated separate scores for each file of the collected security information, indicating an amount of relevance between the input referrer security information and each file of the collected security information, wherein the plural classifications include at least two of a classification of vulnerability, a classification of product or service, a classification of product provider or service provider, a classification of country or organization, and a classification of cyber attack, and the method includes extracting, by referring to the security dictionary, a keyword from the input referrer security information respectively for the at least two of the classification of vulnerability, the classification of product or service, the classification of product provider or service provider, the classification of country or organization, and the classification of cyber attack, calculating, as the separate score, a relevance value for each classification by comparing the keyword extracted from the input referrer security information for each classification respectively with keywords included in the collected security information for the respective classification, and calculating the total score for each file of the collected security information by summing up the relevance values calculated for each classification, and outputting the collected security information in descending order of the calculated total score for each file of the collected security information.

10. A non-transitory computer-readable recording medium for storing therein a computer program that includes instructions which when executed on a security information management system causes the security information management system to execute a method comprising:

storing, in security information storage, collected security information that is information related to security, the security information including one or more files, each file having a title, body text, and at least one keyword extracted from the title or the body text;

receiving input referrer security information input by a user through a user interface, the referrer security information input into a text box in the user interface as arbitrarily chosen text by the user;

extracting, by referring to a security dictionary storing therein a keyword for each of plural classifications, a keyword from the input referrer security information, calculating, by comparing the extracted keyword from the input referrer security information with the at least one keyword extracted from the title or the body text of each file of the collected security information, respectively, a separate score, and calculating a total score, from the calculated separate scores for each file of the collected security information, indicating an amount of relevance between the input referrer security information and each file of the collected security information, wherein the plural classifications include at least two of a classification of vulnerability, a classification of product or service, a classification of product provider or service provider, a classification of country or organization, and a classification of cyber attack, and the method includes extracting, by referring to the security dictionary, a keyword from the input referrer security information respectively for the at least two of the classification of vulnerability, the classification of product or service, the classification of product provider or service provider, the classification of country or organization, and the classification of cyber attack, calculating, as the separate score, a relevance value for each classification by comparing the keyword extracted from the input referrer security information for each classification respectively with keywords included in the collected security information for the respective classification, and calculating the total score for each file of the collected security information by summing up the relevance values calculated for each classification, and outputting the collected security information in descending order of the calculated total score for each file of the collected security information.

* * * * *